US009840656B2

(12) United States Patent
Weaver et al.

(10) Patent No.: US 9,840,656 B2
(45) Date of Patent: Dec. 12, 2017

(54) LATENT CURING AGENT COMPATIBLE WITH LOW PH FRAC FLUIDS

(71) Applicant: Halliburton Energy Services, Inc., Houston, TX (US)

(72) Inventors: Jim D. Weaver, Duncan, OK (US); Philip D. Nguyen, Houston, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 60 days.

(21) Appl. No.: 14/888,438

(22) PCT Filed: Sep. 20, 2013

(86) PCT No.: PCT/US2013/060885
§ 371 (c)(1),
(2) Date: Nov. 1, 2015

(87) PCT Pub. No.: WO2015/041671
PCT Pub. Date: Mar. 26, 2015

(65) Prior Publication Data
US 2016/0108306 A1    Apr. 21, 2016

(51) Int. Cl.
*E21B 43/26*    (2006.01)
*E21B 33/138*   (2006.01)
(Continued)

(52) U.S. Cl.
CPC ......... *C09K 8/5755* (2013.01); *C09K 8/502* (2013.01); *C09K 8/5086* (2013.01); *C09K 8/516* (2013.01); *C09K 8/565* (2013.01); *C09K 8/64* (2013.01); *C09K 8/68* (2013.01); *C09K 8/685* (2013.01); *C09K 8/70* (2013.01); *C09K 8/805* (2013.01); *C09K 8/82* (2013.01); *C09K 8/885* (2013.01);
(Continued)

(58) Field of Classification Search
CPC ................. E21B 33/138; C09K 8/56
See application file for complete search history.

(56) References Cited

U.S. PATENT DOCUMENTS

| 3,759,327 A | * | 9/1973 | Carnes | C09K 8/565 |
| | | | | 166/295 |
| 4,427,069 A | | 1/1984 | Friedman | |

(Continued)

FOREIGN PATENT DOCUMENTS

WO    WO-2015/041671    3/2015

OTHER PUBLICATIONS

Allen et al. Hydrolysis Mechanisms of Alkynyl Benzonates, Tosylates, and Phosphates (1988).*
(Continued)

*Primary Examiner* — Doug Hutton, Jr.
*Assistant Examiner* — Avi Skaist
(74) *Attorney, Agent, or Firm* — Craig W. Roddy; Tumey L.L.P.

(57) ABSTRACT

A method of treating a subterranean formation including providing a treatment fluid comprising a hardenable acid curable resin and a hydrolysable strong acid ester. The treatment fluid is combined with a diluent fluid and is introduced into a subterranean formation. Upon the hydrolyzing of the ester in the formation and the contacting of unconsolidated proppants, the treatment method produces consolidated proppants.

26 Claims, 2 Drawing Sheets

(51) Int. Cl.
- *C09K 8/56* (2006.01)
- *C09K 8/575* (2006.01)
- *C09K 8/502* (2006.01)
- *C09K 8/508* (2006.01)
- *C09K 8/516* (2006.01)
- *C09K 8/565* (2006.01)
- *C09K 8/64* (2006.01)
- *C09K 8/68* (2006.01)
- *C09K 8/70* (2006.01)
- *C09K 8/80* (2006.01)
- *C09K 8/82* (2006.01)
- *C09K 8/88* (2006.01)
- *C09K 8/90* (2006.01)
- *C09K 8/92* (2006.01)
- *E21B 43/267* (2006.01)

(52) U.S. Cl.
CPC .............. *C09K 8/887* (2013.01); *C09K 8/90* (2013.01); *C09K 8/92* (2013.01); *E21B 43/267* (2013.01)

(56) References Cited

U.S. PATENT DOCUMENTS

| | | | |
|---|---|---|---|
| 4,669,543 A * | 6/1987 | Young | C09K 8/5755 166/276 |
| 4,938,287 A * | 7/1990 | Friedman | C09K 8/5753 166/288 |
| 5,377,759 A * | 1/1995 | Surles | C09K 8/5755 166/295 |
| 6,668,926 B2 | 12/2003 | Nguyen et al. | |
| 6,732,800 B2 | 5/2004 | Acock et al. | |
| 6,887,834 B2 | 5/2005 | Nguyen et al. | |
| 6,962,200 B2 | 11/2005 | Nguyen et al. | |
| 7,013,976 B2 | 3/2006 | Nguyen et al. | |
| 7,114,570 B2 | 10/2006 | Nguyen et al. | |
| 7,264,052 B2 | 9/2007 | Nguyen et al. | |
| 7,306,037 B2 | 12/2007 | Nguyen et al. | |
| 7,448,451 B2 | 11/2008 | Nguyen et al. | |
| 2011/0017461 A1 | 1/2011 | Aston et al. | |
| 2011/0278003 A1 | 11/2011 | Rediger | |

OTHER PUBLICATIONS

Ball et al. Introduction to Chemistry0 Chapter 15 (2012).*
"PCT International Search Report and Written Opinion", dated Jun. 23, 2014, Appl No. PCT/US2013/060885, "Latent Curing Agent Compatible with Low pH Frac Fluids," filed Sep. 20, 2013, 10 pgs.
Methods for Enhancing and Maintaining Fracture Conductivity After Fracturing Shale Formations without Proppant Placement, Appl No. PCT/US2013/060876, filed Sep. 20, 2013, 30 pgs.
Methods for Etching Fractures and Microfractures in Shale Formations, Appl No. PCT/US2013/060904, filed Sep. 20, 2013, 31 pgs.

* cited by examiner

LATENT CURING AGENT COMPATIBLE WITH LOW PH FRAC FLUIDS

BACKGROUND

The present invention generally relates to the use of curable resin treatment fluids in subterranean operations, and, more specifically, to the use of hardenable acid curable resin treatment fluids comprising hardenable acid curable resin compounds and strong acid esters, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Conventional treatment methods involve treating the porous, unconsolidated mass sand around the wellbore in order to cement the loose sand grains together, thereby forming a permeable consolidated sand mass which will allow production of fluids but which will restrain the movement of sand particles into the wellbore. These procedures create a permeable barrier or sieve adjacent to the perforations or other openings in the well casing which establish communication between the production formation and the production tubing, which restrains the flow of loose particulate mineral matter such as sand.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. To accomplish this, a viscous fracturing fluid may pumped down the casing to the formation at a rate and a pressure sufficient to form fractures that extend into the formation, providing additional pathways through which the oil or gas can flow to the well. A proppant is a solid material, typically treated sand or man-made ceramic materials, designed to keep an induced hydraulic fracture open, during or following a fracturing treatment. It is added to the fracturing fluid. After the fracturing procedure has been completed, it may be desirable to consolidate the proppant materials.

Typical sand consolidation treatments use plastic resins, and are not entirely satisfactory. Resins tend to reduce the permeability of the consolidated formation below acceptable levels. In addition, resins are relatively costly on a unit volume basis and can be operationally very difficult to properly place in the formation. Certain resins, such as furan based resins, require a high temperature to initiate the curing of the resin. Additionally, when acids are mixed with furan-based resins, a rapid, exothermic reaction may occur. The acids may further cause a degradation of the fluid viscosity.

Accordingly, an ongoing need exists for catalysts that may be added to resins without concern of rapid and exothermic reactions, and catalysts that can cure the resins at low temperatures when placed downhole for consolidating sand and other proppant particles in subterranean formations.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
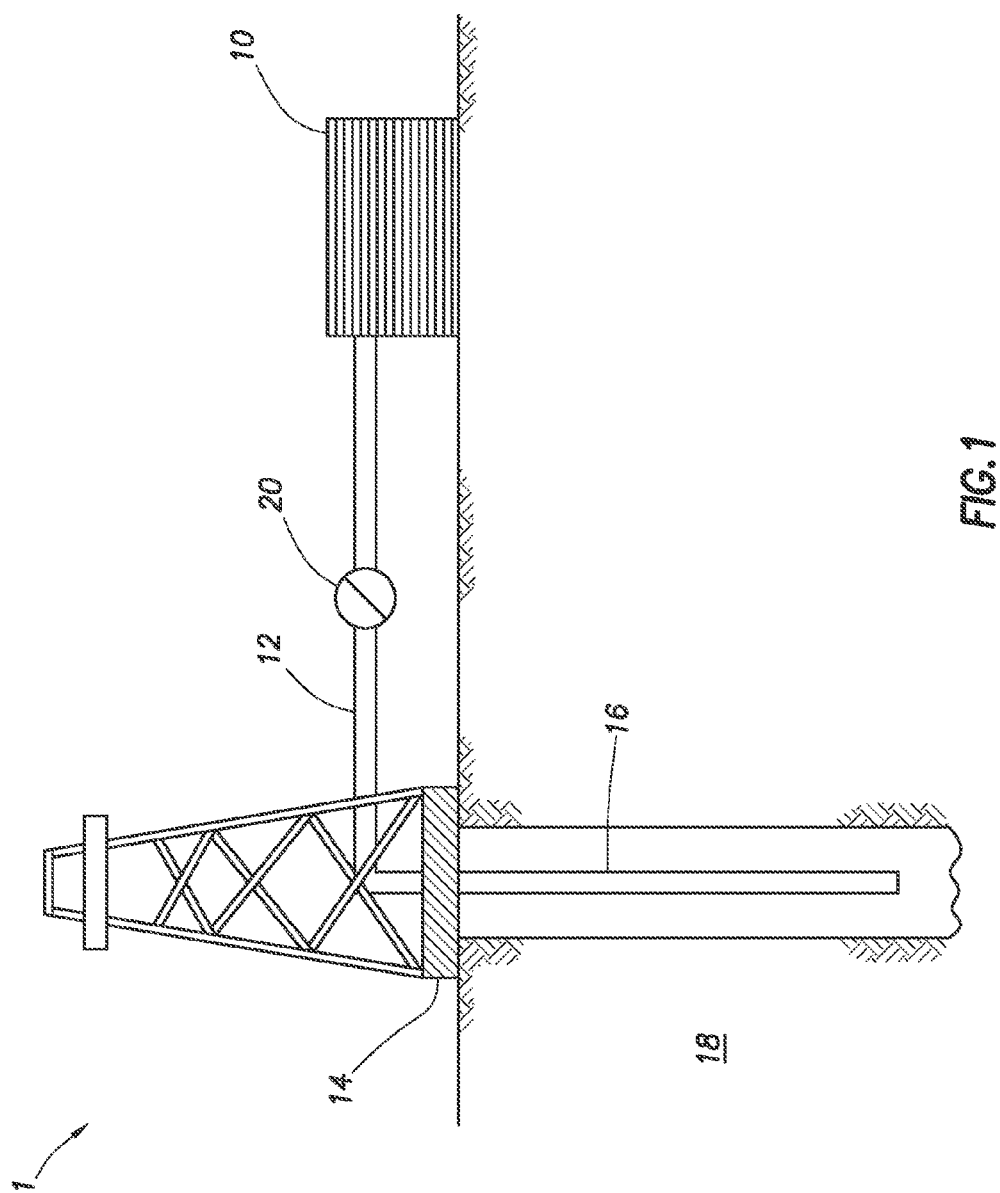
FIG. 1 depicts an embodiment of a system configured for delivering the consolidating agent composition comprising treatment fluids of the embodiments described herein to a downhole location.

In some embodiments of the present invention, a method of treating a wellbore in a subterranean formation includes providing a first fluid comprising a hardenable acid curable resin and a hydrolysable strong acid ester, wherein said ester upon hydrolyzing yields an acid with a $pK_a$ at or below about 3; providing a diluent fluid; placing a first stream comprising the first fluid and the diluent fluid into a zone in the subterranean formation, said zone comprising unconsolidated particulates; hydrolyzing at least a portion of said ester in said formation; and forming consolidated particulates upon the contacting of the unconsolidated particles with the reaction product of the hardenable acid curable resin and hydrolysable strong acid ester upon hydrolyzing in the formation.

In various embodiments, the hydrolyzable strong acid ester is soluble in the hardenable acid curable resin, but remains inert so that a homogeneous mixture can be pre-mixed and stored. However, the curing process of this resin mixture is begun once the ester is exposed to water, allowing the strong acid to be generated by hydrolysis and react. Instead of storing the hardenable acid curable resin and hardening agent separately as commonly required for two component resins, the method described herein allows both components to be stored as a single mixture, and only activated when the hydrolyzable strong acid ester component is exposed to water to release the strong acid, for example, as part of hydraulic fracturing treatment, remedial consolidation treatments for near-wellbore formations, aqueous pre-flush and/or post-flush fluid as part of formation treatment, or for proppant placed in propped fractures.

In many embodiments, the advantages of the single component system include: treating proppant or formation sand as a single component without requiring mixing of individual components, minimizing potential errors of mixing the wrong ratio at the wellsite; the ability to handle a wide range of temperatures, e.g. 70 to 375° F.; the ability to control the cure kinetics to achieve consolidation when needed; and the ability to retain tackiness of the coated surface even after obtaining consolidation of the proppant pack.

In certain embodiments of the present invention, a method of treating a subterranean formation comprises placing a first stream comprising a hardenable acid curing resin, and a hydrolysable strong acid ester into a wellbore in a subterranean formation, said formation comprising unconsolidated particulates, wherein said ester upon hydrolyzing yields an acid with a $pK_a$ at or below about 3; and forming consolidated particulates upon the contacting of the unconsolidated particles with the reaction product of the hardenable acid curing resin, hydrolysable strong acid ester and water in the formation.

Some embodiments of the present invention provide a method for treating a well including providing a wellbore in a subterranean formation; providing a first fluid comprising a hardenable acid curing resin and a hydrolysable strong acid ester, wherein said ester upon hydrolyzing yields an acid with a $pK_a$ at or below about 3; providing proppant particulates; coating the proppant particulates with the first fluid; providing a second stream comprising a diluent fluid; creating at least one fracture in said subterranean formation; placing a first stream comprising the coated proppant particulates and the second stream into the subterranean formation and into at least one fracture therein; wherein the proppant particulates form a proppant pack in the at least one fracture; and forming consolidated proppant particulates upon the curing of the coated proppant particulates in the proppant pack upon hydrolyzing of at least a portion of said strong acid ester.

Another embodiment of the invention includes a well treatment system including a well treatment apparatus configured to: place a first stream comprising a hardenable acid curing resin and a hydrolysable strong acid ester into a wellbore in a subterranean formation, said formation comprising unconsolidated particulates, wherein said ester upon hydrolyzing yields an acid with a $pK_a$ at or below about 3; and form consolidated particulates upon the contacting of the unconsolidated particles with the reaction product of the hardenable acid curing resin, hydrolysable strong acid ester, and water in the formation.

In one embodiment, a method of treating a wellbore in a subterranean formation includes providing a first fluid comprising a hardenable acid curable resin and a hydrolysable strong acid ester, wherein said ester upon hydrolyzing yields an acid with a $pK_a$ at or below about 3; providing a diluent fluid; placing a first stream comprising the first fluid and the diluent fluid into a zone in the subterranean formation, said zone comprising unconsolidated particulates; hydrolyzing at least a portion of said ester in said formation; and forming consolidated particulates upon the contacting of the unconsolidated particles with the reaction product of the hardenable acid curable resin and hydrolysable strong acid ester upon hydrolyzing in the formation. In certain embodiments, the forming includes reacting the hardenable acid curable resin, hydrolysable strong acid ester, and water in the formation, thereby forming a reaction product. In further embodiments, the reaction product is cured to the unconsolidated particulates. In some embodiments, the hardenable acid curable resin includes melamine resins with secondary amino groups. These melamine resins may comprise a resin selected from the group consisting of phenolic; furan; aldehyde; novolac; epoxy; and combinations thereof. In an exemplary embodiment, the resin is a furan resin. In certain embodiments, the hardenable acid curable resin is present in the amount of about 0.1% to about 15% by weight of the diluent fluid. In some embodiments, the hydrolysable strong acid ester comprises at least one member selected from the group consisting of methyl tosylate and homologous series; methyl methane sulfonate and homologous series; methyl trichloroacetate and homologous series; methyl trifluroacetate and homologous series; dimethyl methylphosphonate and homologous series; and any combination thereof. In exemplary embodiments, the hydrolysable strong acid ester comprises a tosylated ester. In certain embodiments, the hydrolysable strong acid ester is present in the amount of about 0.01% to about 5% by weight of the diluent fluid. In some embodiments, said ester upon hydrolyzing yields an acid with a $pK_a$ value at or below about one of the following: 2.5, 2, 1.5, 1, 0.5, 0, −0.5, −1, −1.5, −2, −2.5, −3, −3.5, −4, −4.5, and −5. In an embodiment, the hydrolysable strong acid ester produces a fluid with a pH of about 3.0 or less upon being hydrolyzed by water in the formation. In other embodiments, the hydrolysable strong acid ester is encapsulated in a hydrolysable material. In certain embodiment, the diluent fluid comprises a non-aqueous base fluid. In further embodiments, at least one of the hardenable acid curable resin and the hydrolysable strong acid ester is soluble in the diluent fluid. In several embodiments, the first stream further comprises a catalyst, wherein the catalyst comprises at least one member selected from organic amine bases, inorganic bases, and mixtures thereof. In exemplary embodiments, the organic amine base is selected from the following group consisting of pyridine, isoquinoline, quinoline, N,N-dimethylcyclohexylamine, tributylamine, tripropylamie, N-ethylmorpholine, dimethylaniline, and mixtures thereof. In other embodiments, the inorganic base is selected from the following group consisting of potassium hydroxide, sodium hydroxide, ammonium hydroxide, and mixtures thereof. In certain embodiments, the catalyst is present in the amount of about 0.01% to about 5% by weight of the diluent fluid. In some embodiments, the first stream may include a silane coupling agent. In exemplary embodiments, the silane coupling agent includes at least one member selected from the group consisting of N-2-(aminoethyl)-3-aminopropyltrimethoxysilane; 3-glycidoxypropyltrimethoxysilane; n-beta-(aminoethyl)-gamma-aminopropyl trimethoxysilane; and combinations thereof. In certain embodiments, the coupling agent is present in the amount of about 0.01% to about 2% by weight of the diluent fluid. In some embodiments, the first stream further comprises a surfactant for facilitating the contacting of the unconsolidated particulates with the reaction product. In exemplary embodiments, the surfactant comprises at least one member selected from the group consisting of an ethoxylated nonyl phenol phosphate ester; mixtures of one or more cationic surfactants; a $C_{12}$-$C_{22}$ alkyl phosphonate surfactant; a mixture of one or more non-ionic surfactants; an alkyl phosphonate surfactant; and mixtures thereof. In certain embodiments, the surfactant is present in the amount of about 0.01% to about 5% by weight of the diluent fluid.

Some embodiments of the present invention provide a method for treating a well including providing a wellbore in a subterranean formation; providing a first fluid comprising a hardenable acid curing resin and a hydrolysable strong acid ester, wherein said ester upon hydrolyzing yields an acid with a $pK_a$ at or below about 3; providing proppant particulates; coating the proppant particulates with the first fluid; providing a second stream comprising a diluent fluid; creating at least one fracture in said subterranean formation; placing a first stream comprising the coated proppant particulates and the second stream into the subterranean formation and into at least one fracture therein; wherein the proppant particulates form a proppant pack in the at least one fracture; and forming consolidated proppant particulates upon the curing of the coated proppant particulates in the proppant pack upon hydrolyzing of at least a portion of said strong acid ester. In some embodiments, the forming (consolidation) includes reacting the hardenable acid curable resin, hydrolysable strong acid ester, and water in the formation, thereby forming a reaction product. In further embodiments, the reaction product is cured to the unconsolidated particulates. In some embodiments, the hardenable acid curable resin includes melamine resins with secondary amino groups. These melamine resins may comprise a resin selected from the group consisting of phenolic; furan; aldehyde; novolac; epoxy; and combinations thereof. In an exemplary embodiment, the resin is a furan resin. In certain embodiments, the hardenable acid curable resin is present in the amount of about 0.1% to about 85% by weight of the diluent fluid. In some embodiments, the hydrolysable strong acid ester comprises at least one member selected from the group consisting of methyl tosylate and homologous series; methyl methane sulfonate and homologous series; methyl trichloroacetate and homologous series; methyl trifluroacetate and homologous series; dimethyl methylphosphonate and homologous series; and any combination thereof. In exemplary embodiments, the hydrolysable strong acid ester comprises a tosylated ester. In certain embodiments, the hydrolysable strong acid ester is present in the amount of about 0.01% to about 5% by weight of the diluent fluid. In some embodiments, said ester upon hydrolyzing yields an acid with a $pK_a$ value at or below about one of the following: 2.5, 2, 1.5, 1, 0.5, 0, −0.5, −1, −1.5, −2, −2.5, −3, −3.5, −4, −4.5, and −5. In an embodiment, the hydrolysable strong acid ester produces a fluid with a pH of about 3.0 or less upon being hydrolyzed by water in the formation. In other embodiments, the hydrolysable strong acid ester is encapsulated in a hydrolysable material. In certain embodiment, the diluent fluid comprises a non-aqueous base fluid. In further embodiments, at least one of the hardenable acid curable resin and the hydrolysable strong acid ester is soluble in the diluent fluid. In several embodiments, the first stream further comprises a catalyst, wherein the catalyst comprises at least one member selected from organic amine bases, inorganic bases, and mixtures thereof. In exemplary embodiments, the organic amine base is selected from the following group consisting of pyridine, isoquinoline, quinoline, N,Ndimethylcyclohexylamine, tributylamine, tripropylamie, N-ethylmorpholine, dimethylaniline, and mixtures thereof. In other embodiments, the inorganic base is selected from the following group consisting of potassium hydroxide, sodium hydroxide, ammonium hydroxide, and mixtures thereof. In certain embodiments, the catalyst is present in the amount of about 0.01% to about 5% by weight of the diluent fluid. In some embodiments, the first stream may include a silane coupling agent. In exemplary embodiments, the silane coupling agent includes at least one member selected from the group consisting of N-2-(aminoethyl)-3-aminopropyltrimethoxysilane; 3-glycidoxypropyltrimethoxysilane; n-beta-(aminoethyl)-gamma-aminopropyl trimethoxysilane; and combinations thereof. In certain embodiments, the coupling agent is present in the amount of about 0.01% to about 2% by weight of the diluent fluid. In some embodiments, the first stream further comprises a surfactant for facilitating the contacting of the unconsolidated particulates with the reaction product. In exemplary embodiments, the surfactant comprises at least one member selected from the group consisting of an ethoxylated nonyl phenol phosphate ester; mixtures of one or more cationic surfactants; a $C_{12}$-$C_{22}$ alkyl phosphonate surfactant; a mixture of one or more non-ionic surfactants; an alkyl phosphonate surfactant; and mixtures thereof. In certain embodiments, the surfactant is present in the amount of about 0.01% to about 5% by weight of the diluent fluid.

Another embodiment of the invention includes a well treatment system including a well treatment apparatus configured to: place a first stream comprising a hardenable acid curing resin and a hydrolysable strong acid ester into a wellbore in a subterranean formation, said formation comprising unconsolidated particulates, wherein said ester upon hydrolyzing yields an acid with a pKa at or below about 3; and form consolidated particulates upon the contacting of the unconsolidated particles with the reaction product of the hardenable acid curing resin, hydrolysable strong acid ester, and water in the formation. In certain embodiments, the forming includes reacting the hardenable acid curable resin, hydrolysable strong acid ester, and water in the formation, thereby forming a reaction product. In further embodiments, the reaction product is cured to the unconsolidated particulates. In some embodiments, the hardenable acid curable resin includes melamine resins with secondary amino groups. These melamine resins may comprise a resin selected from the group consisting of phenolic; furan; aldehyde; novolac; epoxy; and combinations thereof. In an exemplary embodiment, the resin is a furan resin. In certain embodiments, the hardenable acid curable resin is present in the amount of about 0.1% to about 15% by weight of the diluent fluid. In some embodiments, the hydrolysable strong acid ester comprises at least one member selected from the group consisting of methyl tosylate and homologous series; methyl methane sulfonate and homologous series; methyl trichloroacetate and homologous series; methyl trifluroacetate and homologous series; dimethyl methylphosphonate and homologous series; and any combination thereof. In exemplary embodiments, the hydrolysable strong acid ester comprises a tosylated ester. In certain embodiments, the hydrolysable strong acid ester is present in the amount of about 0.01% to about 5% by weight of the diluent fluid. In some embodiments, said ester upon hydrolyzing yields an acid with a $pK_a$ value at or below about one of the following: 2.5, 2, 1.5, 1, 0.5, 0, −0.5, −1, −1.5, −2, −2.5, −3, −3.5, −4, −4.5, and −5. In an embodiment, the hydrolysable strong acid ester produces a fluid with a pH of about 3.0 or less upon being hydrolyzed by water in the formation. In other embodiments, the hydrolysable strong acid ester is encapsulated in a hydrolysable material. In certain embodiment, the diluent fluid comprises a non-aqueous base fluid. In further embodiments, at least one of the hardenable acid curable resin and the hydrolysable strong acid ester is soluble in the diluent fluid. In several embodiments, the first stream further comprises a catalyst, wherein the catalyst comprises at least one member selected from organic amine bases, inorganic bases, and mixtures thereof. In exemplary embodiments, the organic amine base is selected from the following group consisting of pyridine, isoquinoline, quinoline, N,N-dimethylcyclohexylamine, tributylamine, tripropylamie, N-ethylmorpholine, dimethylaniline, and mixtures thereof. In other embodiments, the inorganic base is selected from the following group consisting of potassium hydroxide, sodium hydroxide, ammonium hydroxide, and mixtures thereof. In certain embodiments, the catalyst is present in the amount of about 0.01% to about 5% by weight of the diluent fluid. In some embodiments, the first stream may include a silane coupling agent. In exemplary embodiments, the silane coupling agent includes at least one member selected from the group consisting of N-2-(aminoethyl)-

3-aminopropyltrimethoxysilane; 3-glycidoxypropyltrimethoxysilane; n-beta-(aminoethyl)-gamma-aminopropyl trimethoxysilane; and combinations thereof. In certain embodiments, the coupling agent is present in the amount of about 0.01% to about 2% by weight of the diluent fluid. In some embodiments, the first stream further comprises a surfactant for facilitating the contacting of the unconsolidated particulates with the reaction product. In exemplary embodiments, the surfactant comprises at least one member selected from the group consisting of an ethoxylated nonyl phenol phosphate ester; mixtures of one or more cationic surfactants; a $C_{12}$-$C_{22}$ alkyl phosphonate surfactant; a mixture of one or more non-ionic surfactants; an alkyl phosphonate surfactant; and mixtures thereof. In certain embodiments, the surfactant is present in the amount of about 0.01% to about 5% by weight of the diluent fluid.

One of the advantages of some embodiments of the present invention is the ability to tailor the rate of the crosslinking reaction by the addition of one or more polymerization rate retarders. Other advantages may be evident to one skilled in the art.

In certain embodiments, before the reaction occurs, the treatment fluids of the present invention may comprise a diluent fluid; a hardenable acid curing resin, and a hydrolysable strong acid ester. After the hydrolysis of the strong acid ester occurs, a treatment fluid in accordance with the present invention may comprise a diluent fluid and a reaction product of a hardenable acid curing resin and a strong acid. The reaction may initiate before contacting the proppant particles, or after the particles have been contacted.

Diluent Fluids

In some embodiments, diluent fluids are used to deliver the hardenable acid curing resin and hydrolysable strong acid ester into a wellbore. Typically, at least one of the hardenable acid curable resin and the hydrolysable strong acid ester is soluble in the diluent fluid. In certain embodiments, the diluent fluid comprises a non-aqueous base fluid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof.

Aqueous Base Fluids

The aqueous base fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm$^3$ or greater).

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid. When the solubility of the polyvalent metal salt of carboxylic acid, the water-soluble polymerization initiator, or other components that may be added to the fluids described herein are low, a solvent may optionally be included with the aqueous base fluid so as to aid in solubility and/or polymerization and curing of the polyvalent metal salt of carboxylic acid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof. For purposes of this disclosure, a material is considered as water-soluble if the solubility of the material in water at room temperature is 5% or higher.

Hardenable Acid Curable Resins

Treatment fluids of the present invention comprise a hardenable acid curable resin. In some embodiments, the resin comprises melamine resins with secondary amino groups. In other embodiments, the melamine resins comprise at least one resin selected from the group consisting of phenolic, furan, aldehyde, novolac, epoxy, and combinations thereof. In preferred embodiments, the hardenable acid curable resin comprises a furan resin.

In various embodiments, an amount of the hardenable acid curable resin present in the treatment fluids is from about 1 wt. % to about 30 wt. %, alternatively, about 5 wt. % to about 20 wt. % alternatively about 10 wt. % to about 15 wt. % based on weight of diluent fluid used in the treatment fluid.

Hydrolysable Strong Acid Esters

The treatment fluids of the present invention also include hydrolysable strong acid esters. Upon hydrolyzing, the strong acid ester yields a strong acid. For purposes of this disclosure, a strong acid has a $pK_a$ value of about 3 or less in water. Weak acids have a $pK_a$ above about 3 to about 12 in water. Typically, with a strong acid, the pH of the resulting solution depends on the concentration of the acid; whereas, a weak acid pH depends on the ionization constant of the acid. In certain embodiments, the $pK_a$ value of strong acids is below about one of the following: 2.5, 2, 1.5, 1, 0.5, 0, −0.5, −1, −1.5, −2, −2.5, −3, −3.5, −4, −4.5, and −5.

In some embodiments, the strong acid ester, upon hydrolyzing, yields an acid with a pH at or below about 4. In another embodiment, the strong acid ester, upon hydrolyzing, yields an acid with a pH at or below about 3. In yet another embodiment, the strong acid ester, upon hydrolyzing, yields an acid with a pH at or below about 2. In a further embodiment, the strong acid ester, upon hydrolyzing, yields an acid with a pH at or below about 1.

Non-limiting examples of hydrolysable strong acid esters include at least one member selected from the group consisting of methyl tosylate and homologous series, methyl methane sulfonate and homologous series, methyl trichloroacetate and homologous series, methyl trifluroacetate and homologous series, dimethyl methylphosphonate and homologous series; and any combination thereof. In one embodiment, the hydrolysable strong acid ester comprises a tosylated ester.

In some embodiments, hydrolysable strong acid ester is encapsulated in a hydrolysable material. In certain embodiments, the encapsulated hydrolysable material forms a capsule. Using encapsulated well treatment chemicals permits blending of normally incompatible compounds in the treatment fluid. As a non-limiting example, the present invention permits the transport of the hydrolysable strong acid ester to a downhole environment by a treatment fluid having a neutral or basic pH without detrimentally impacting either the treatment fluid or the strong acid ester. A non-limiting list of mechanisms suitable for releasing the encapsulated strong acid ester includes: a change in pH, crushing, rupture, dissolution of the membrane, diffusion and/or thermal melting of the encapsulating membrane. Following placement of the compounds downhole, the strong acid esters are then released from the capsules and allowed to react. The controlled downhole release of the strong acid esters will significantly improve their functionality.

In various embodiments, an amount of the hydrolysable strong acid ester present in the treatment fluids is from about 1 wt. % to about 30 wt. %, alternatively, about 2 wt. % to about 20 wt. % alternatively about 3 wt. % to about 15 wt. % based on weight of diluent fluid used in the treatment fluid.

Catalysts

The treatment fluids of the present invention may optionally include at least one catalyst to control the rate of reaction between the hardenable acid curable resin and a hydrolysable strong acid ester. The cure kinetics of this resin system are controlled by the concentration of the selected catalyst and temperature. A variety of catalysts can be used in accordance with the present embodiments. In some embodiments, the catalysts are at least one member selected from organic amine bases, inorganic bases, and mixtures thereof. In certain embodiments, the organic amine base is selected from the following group consisting of pyridine, isoquinoline, quinoline, N,N dimethylcyclohexylamine, tributylamine, tripropylamie, N-ethylmorpholine, dimethylaniline, and mixtures thereof. In exemplary embodiments, the inorganic base is selected from the following group consisting of potassium hydroxide, sodium hydroxide, ammonium hydroxide, and mixtures thereof. The catalyst may be present in an amount in the range of from and upper limit of about 5%, 4.8%, 4.6%, 4.4%, 4.2%, 4%, 3.8%, 3.6%, 3.4%, 3.2%, 3%, 2.8%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the hardenable acid curable resin. In other embodiments, the catalyst may be present in an amount in the range of from about 1% to about 2% by weight of the hardenable acid curable resin.

Having the benefit of the present disclosure and knowing the temperature and chemistry of a subterranean formation of interest, one having ordinary skill in the art will be able to choose a catalyst and an amount thereof suitable for producing a desired coating of the proppant particulates.

Surfactants

In some embodiments, the treatment fluids include a surfactant for facilitating the contacting of the unconsolidated particulates with the reaction product of the hardenable acid curable resin, hydrolysable strong acid ester and water in the formation. In several embodiments, the surfactant facilitates the coating of the resin on the proppant particles and causes the hardenable resin to flow to the contact points between adjacent resin coated proppant particles. In exemplary embodiments, the surfactant comprises at least one member selected from the group consisting of an ethoxylated nonyl phenol phosphate ester, mixtures of one or more cationic surfactants, a $C_{12}$-$C_{22}$ alkyl phosphonate surfactant, a mixture of one or more non-ionic surfactants, an alkyl phosphonate surfactant, and mixtures thereof. In certain embodiments, the surfactant is present in an amount of less than about 5% by weight of the treatment fluid. In other embodiments, the surfactant is present in an amount of less than about 3% by weight of the treatment fluid.

Coupling Agents

The treatment fluids of the present invention may further comprise a coupling agent. Coupling agents suitable for use in combination with the treatment fluids include without limitation a silicone-based coupling agent (e.g., a silicone-based coupling agent comprising a siloxy moiety). Suitable silicone-based coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; gamma-ureidopropyltriethoxysilanes; beta-(3-4-epoxy-cyclohexyl)-ethyltrimethoxysilane; vinyltrichlorosilane; vinyltris (beta-methoxyethoxy) silane; vinyltriethoxysilane; vinyltrimethoxysilane; 3-methacryloxypropyltrimethoxysilane; r-glycidoxypropylmethylidiethoxysilane; 3-aminopropyl-triethoxysilane; N-phenyl-r-aminopropyltrimethoxysilane; r-mercaptopropyltrimethoxysilane; r-chloropropyltrimethoxysilane; r-glycidoxypropylmethylidiethoxysilane; N-beta-(aminoethyl)-r-aminopropylmethyldimethoxysilane; r-aminopropyltriethoxysilane; N-[3-(trimethoxysilyppropyl]-ethylenediamine; any derivative thereof; and any combination thereof. The amount of the coupling agent may range from about 0.01 wt. % to about 5 wt. %, alternately, from about 0.1 wt. % to about 2 wt. % by weight of the hardenable acid curable resins.

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition. In some embodiments, the sand may be graded sand that is sized based on a knowledge of the size of the lost circulation zone. The graded sand may have a particle size in the range of from about 10 to about 70 mesh, U.S. Sieve Series.

In certain embodiments, the proppants are present in an amount of less than about 5% by volume of the treatment fluid. In other embodiments, the proppants are present in an amount of less than about 3% by volume of the treatment fluid.

In some embodiments, the proppants are coated with a hardenable acid curing resin and a hydrolysable strong acid ester before they have been placed downhole. In other embodiments, the proppants are coated after they have been placed in the subterranean formation.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the diluent fluid at a subsequent time. After the preblended liquids and the diluent fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable. Other potential applications of this resin system, with some minor adjustments such as modifying the dilution factor with the diluents fluid or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid is placed into a wellbore as a single stream and activated by downhole conditions to form a barrier that substantially seal lost circulation zones or other undesirable flowpaths.

In an embodiment, the consolidation treatment fluid may be introduced into the wellbore, the formation, or a lost circulation zone as a single pill fluid. That is, in such an embodiment, all components of the consolidation treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

In some embodiments, the present treatment fluids can be used in a subterranean formation having a temperature of up to about 250° F. In some embodiments, the present treatment fluids can be used in a subterranean formation having a temperature of up to about 220° F. In some embodiments, the present treatment fluids can be used in a subterranean formation having a temperature ranging between about 75° F. and about 250° F. In some embodiments, the present treatment fluids can be used in a subterranean formation having a temperature ranging between about 100° F. and about 250° F. In some embodiments, the present treatment fluids can be used in a subterranean formation having a temperature ranging between about 150° F. and about 250° F. In some embodiments, the present treatment fluids can be used in a subterranean formation having a temperature ranging between about 175° F. and about 250° F. In some embodiments, the present treatment fluids can be used in a subterranean formation having a temperature ranging between about 200° F. and about 250° F. In some embodiments, the present treatment fluids can be used in a subterranean formation having a temperature ranging between about 220° F. and about 250° F.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the hardenable acid curing resin and hydrolysable strong acid ester compositions, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

EXAMPLE

The invention having been generally described, the following examples are given as particular embodiments of the invention and to demonstrate the practice and advantages hereof. It is understood that the examples are given by way of illustration and are not intended to limit the specification or the claims to follow in any manner.

Fluid Properties During Sand Coating

Example 1

Figure 2:
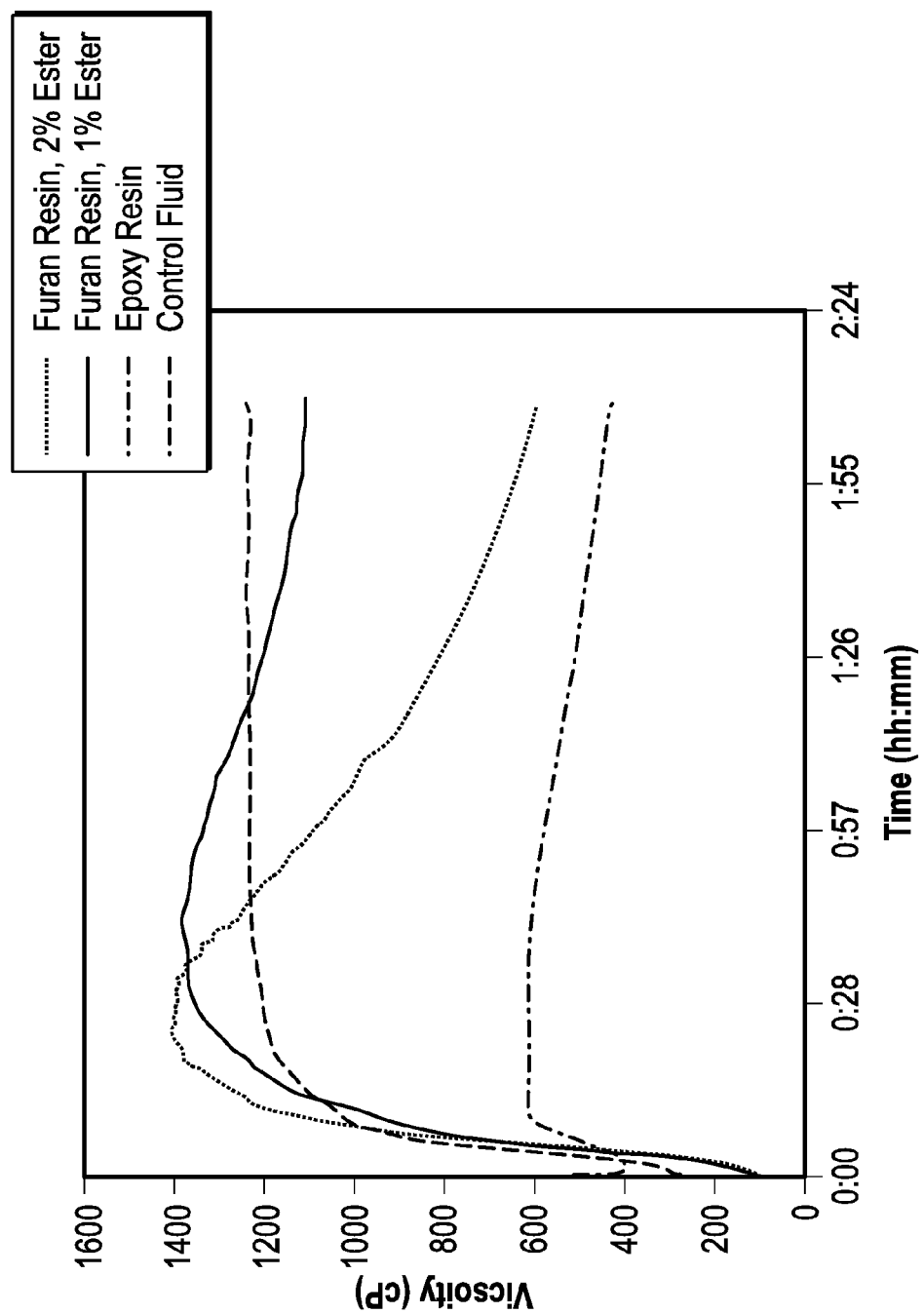
FIG. 2 depicts fluid performance over time while coating sand utilizing treatment fluids of the embodiments disclosed herein.

FIG. 2 shows the testing results from a Chandler viscometer of PermStim LT™ fluid (a fracturing fluid utilizing a polymer with performance comparable to guar systems, available from Halliburton Energy Services, Inc. in Houston, Tex.) with Expedite 225™ (an acid curable epoxy resin available from Halliburton Energy Services, Inc. in Houston, Tex.) and Expedite 550™ (an acid curable furan based resin available from Halliburton Energy Services, Inc. in Houston, Tex.) with Methyl p-toluenesulfonate ester. Fluid performance significantly deteriorated when Expedite 225™ was used with PermStim LT™ but virtually no effect on fluid viscosity was observed when a tosylated ester was used in combination with Expedite 550™ The temperature was 140° F. In a typical experiment 6-ppg proppant loading of 20/40 mesh Ottawa sand was coated with sand coating (Expedite 550™). Expedite 550™ was premixed with Methyl p-toluenesulfonate ester (1:1) before coating on the proppant. Coating agents were added based on a percentage of proppant mass (Expedite 550™-1.5%). For each test performed, the proppant and coating agent were sufficiently dry mixed prior to the addition of the base polymer (a metal crosslinkable polysaccharide available from Halliburton Energy Services, Inc.) fluid. A 40-pptg (pounds per thousand gallons) WG-39 was used for compatibility studies with sand coatings.

One of skill in the art will appreciate that the data in FIG. 2 demonstrates that fluid viscosity may be maintained when treatment fluids of the present invention containing hardenable acid curable resins and hydrolysable strong acid esters are used to coat sand.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating a wellbore in a subterranean formation comprising:
    providing a first fluid comprising a hardenable acid curable resin and a hydrolysable strong acid ester, wherein said ester upon hydrolyzing yields an acid with a $pK_a$ at or below about 3;
    providing a diluent fluid;
    placing a first stream comprising the first fluid and the diluent fluid into a zone in the subterranean formation, said zone comprising unconsolidated particulates;
    hydrolyzing at least a portion of said ester in said formation; and
    forming consolidated particulates upon the contacting of the unconsolidated particles with the reaction product of the hardenable acid curable resin and hydrolysable strong acid ester upon hydrolyzing in the formation.

2. The method of claim 1, wherein the hardenable acid curable resin comprises melamine resins with secondary amino groups.

3. The method of claim 2, wherein the melamine resins comprise at least one resin selected from the group consisting of phenolic; furan; aldehyde; novolac; epoxy; and combinations thereof.

4. The method of claim 1, wherein the hardenable acid curable resin comprises a furan resin.

5. The method of claim 1, wherein the hydrolysable strong acid ester comprises at least one member selected from the group consisting of methyl tosylate and homologous series; methyl methane sulfonate and homologous series; methyl trichloroacetate and homologous series; methyl trifluroacetate and homologous series; dimethyl methylphosphonate and homologous series; and any combination thereof.

6. The method of claim 5, wherein the hydrolysable strong acid ester comprises a tosylated ester.

7. The method of claim 1, wherein the first stream further comprises a catalyst.

8. The method of claim 7, wherein the catalyst comprises at least one member selected from organic amine bases; inorganic bases; and mixtures thereof.

9. The method of claim 8, wherein the organic amine base is selected from the following group consisting of pyridine; isoquinoline; quinoline; N,N dimethylcyclohexylamine; tributylamine; tripropylamie; N-ethylmorpholine; dimethylaniline; and mixtures thereof.

10. The method of claim 8, wherein the inorganic base is selected from the following group consisting of potassium hydroxide; sodium hydroxide; ammonium hydroxide; and mixtures thereof.

11. The method of claim 1, wherein the first stream further comprises a silane coupling agent.

12. The method of claim 11, wherein the silane coupling agent comprises at least one member selected from the group consisting of N-2-(aminoethyl)-3-aminopropyltrimethoxysilane; 3-glycidoxypropyltrimethoxysilane; n-beta-(aminoethyl)-gamma-aminopropyl trimethoxysilane; and combinations thereof.

13. The method of claim 1, wherein the first stream further comprises a surfactant for facilitating the contacting of the unconsolidated particulates with the reaction product.

14. The method of claim 13, wherein the surfactant comprises at least one member selected from the group consisting of an ethoxylated nonyl phenol phosphate ester; mixtures of one or more cationic surfactants; a $C_{12}$-$C_{22}$ alkyl phosphonate surfactant; a mixture of one or more non-ionic surfactants; an alkyl phosphonate surfactant; and mixtures thereof.

15. The method of claim 1, wherein the zone comprises proppant particulates forming a proppant pack in a fracture.

16. The method of claim 15, wherein the proppant is sand.

17. The method of claim 1, wherein the forming comprises reacting the hardenable acid curable resin, hydrolysable strong acid ester, and water in the formation, thereby forming a reaction product.

18. The method of claim 17, further comprising curing the reaction product to the unconsolidated particulates.

19. The method of claim 1, wherein the hydrolysable strong acid ester produces a fluid with a pH of about 3.0 or less upon being hydrolyzed by water in the formation.

20. The method of claim 1, wherein the hydrolysable strong acid ester is encapsulated in a hydrolysable material.

21. The method of claim 1, wherein the diluent fluid comprises a non-aqueous base fluid.

22. The method of claim 1, wherein at least one of the hardenable acid curable resin and the hydrolysable strong acid ester is soluble in the diluent fluid.

23. A method comprising:
    placing a first stream comprising a hardenable acid curable resin and a hydrolysable strong acid ester into a wellbore in a subterranean formation, said formation comprising unconsolidated particulates, wherein said ester upon hydrolyzing yields an acid with a $pK_a$ at or below about 3; and
    forming consolidated particulates upon the contacting of the unconsolidated particles with the reaction product of the hardenable acid curable resin, hydrolysable strong acid ester, and water in the formation.

24. A method comprising:
    providing a wellbore in a subterranean formation;
    providing a first fluid comprising a hardenable acid curable resin and a hydrolysable strong acid ester, wherein said ester upon hydrolyzing yields an acid with a $pK_a$ at or below about 3;
    providing proppant particulates;
    coating the proppant particulates with the first fluid;
    providing a second stream comprising a diluent fluid;
    creating at least one fracture in said subterranean formation;

placing a first stream comprising the coated proppant particulates and the second stream into the subterranean formation and into at least one fracture therein;

wherein the proppant particulates form a proppant pack in the at least one fracture; and forming consolidated proppant particulates upon the curing of the coated proppant particulates in the proppant pack upon hydrolyzing of at least a portion of said strong acid ester.

25. A well treatment system comprising:

a well treatment apparatus configured to:
place a first stream comprising a hardenable acid curable resin and a hydrolysable strong acid ester into a wellbore in a subterranean formation, said formation comprising unconsolidated particulates, wherein said ester upon hydrolyzing yields an acid with a $pK_a$ at or below about 3; and form consolidated particulates upon the contacting of the unconsolidated particles with the reaction product of the hardenable acid curable resin, hydrolysable strong acid ester, and water in the formation.

26. The method of claim 1, wherein the viscosity of the first stream is substantially maintained before the hydrolyzing of the hydrolysable strong acid ester occurs.

* * * * *